United States Patent [19]

Nakamura

[11] Patent Number: 5,597,954
[45] Date of Patent: Jan. 28, 1997

[54] BEARING SENSOR AND BEARING-DISTANCE SENSOR

[75] Inventor: Takeshi Nakamura, Uji, Japan

[73] Assignee: Murata Manufacturing Co., Ltd., Japan

[21] Appl. No.: 539,133

[22] Filed: Oct. 4, 1995

[30] Foreign Application Priority Data

Oct. 4, 1994 [JP] Japan .................................. 6-266367
Nov. 17, 1994 [JP] Japan .................................. 6-309993

[51] Int. Cl.$^6$ .................................................. G01P 7/00
[52] U.S. Cl. ......................... 73/503; 73/178 R; 73/504.03
[58] Field of Search ........................... 73/178 R, 504.03, 73/504.02, 503, 504.07, 506, 511, 510

[56] References Cited

U.S. PATENT DOCUMENTS

| | | | |
|---|---|---|---|
| 4,393,709 | 7/1983 | Harumatsu et al. | 73/505 |
| 4,590,801 | 5/1986 | Merhav | 73/510 |
| 4,601,206 | 7/1986 | Watson | 73/510 |
| 4,711,125 | 12/1987 | Morrison | 73/178 R |
| 5,266,948 | 11/1993 | Matsumoto | 73/178 R |
| 5,469,360 | 11/1995 | Ihara et al. | 73/178 R |

OTHER PUBLICATIONS

European Search Report on European Patent Application No. EP–95–11 5652; Jan. 10, 1996.

*Primary Examiner*—Sandra L. O'Shea
*Assistant Examiner*—Max H. Noori
*Attorney, Agent, or Firm*—Ostrolenk, Faber, Gerb & Soffen, LLP

[57] ABSTRACT

A small and inexpensive bearing-distance sensor capable of detecting a travel bearing and a travel distance of a vehicle. The bearing-distance sensor includes a rectangular parallelepiped case. A first acceleration sensor and a second acceleration sensor are mounted within the case. The first acceleration sensor detects an acceleration in a first direction, e.g. the longitudinal direction of the case, to obtain a signal related to the acceleration, and the second acceleration sensor detects a force applied in the width direction of the case, which is perpendicular to the first direction, to obtain a signal related to that force. The travel distance of the vehicle is found from the output signal of the first acceleration sensor, and the travel bearing of the vehicle is found from the output signals of the first and second acceleration sensors.

4 Claims, 4 Drawing Sheets

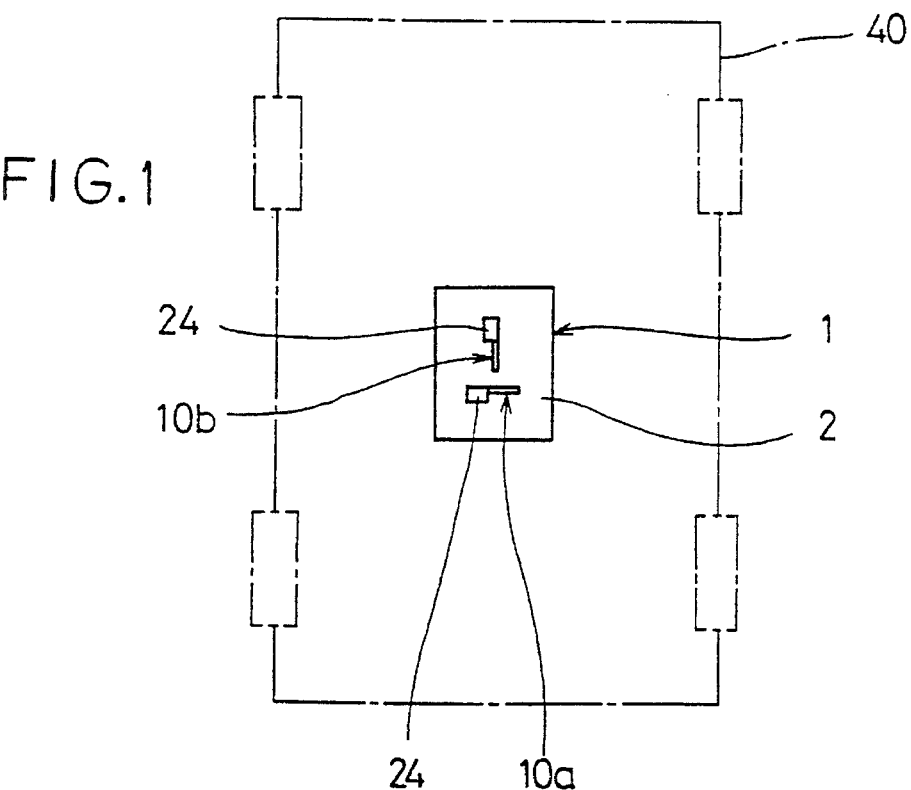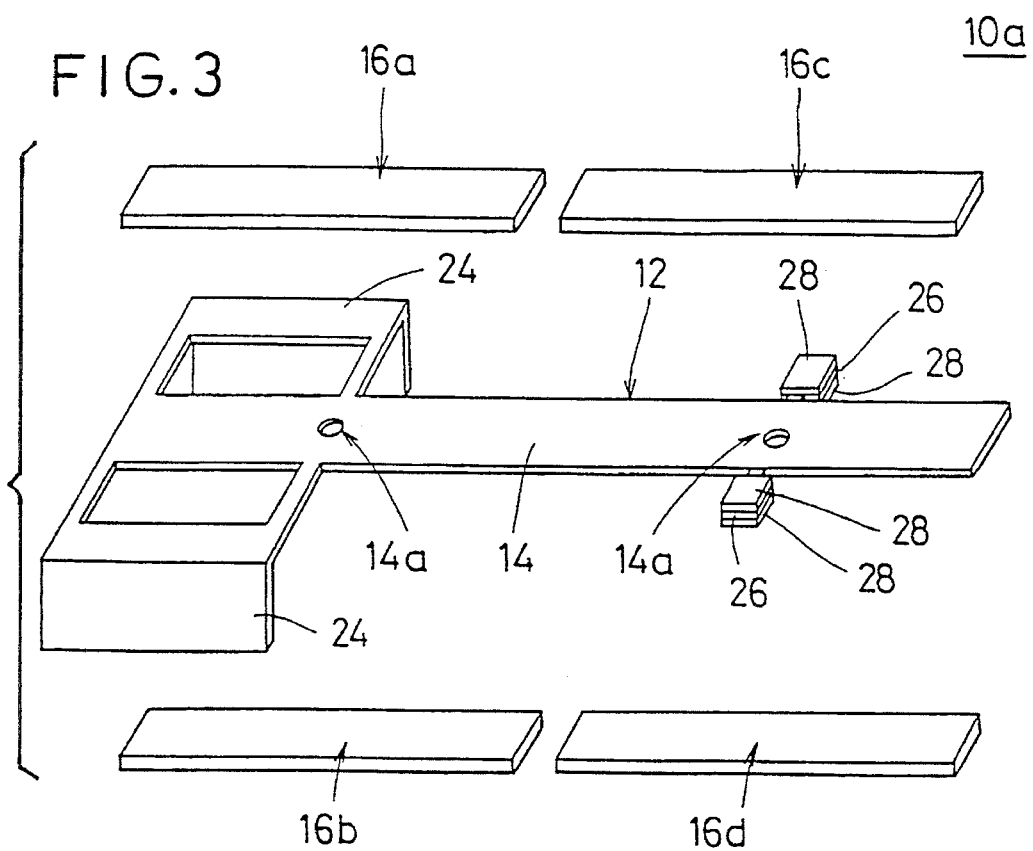

BEARING SENSOR AND BEARING-DISTANCE SENSOR

BACKGROUND OF THE INVENTION

1. Field of the Invention

The present invention relates generally to a bearing (direction) sensor and a bearing-distance sensor, and more particularly to a bearing sensor and a bearing-distance sensor for use in a car navigation system, for example, the bearing sensor being capable of detecting a travel bearing of a vehicle, and the bearing-distance sensor being capable of detecting both a travel bearing and a travel distance of the vehicle.

2. Description of the Related Art

There exists a car navigation system using a bearing sensor for detecting a travel bearing and a distance sensor for detecting a travel distance. There are also two types of bearing sensors; one using a vibratory gyroscope and another wherein two acceleration sensors are disposed horizontally with a wide space therebetween. The bearing sensor using the vibratory gyroscope detects an angular velocity of rotation by means of the vibratory gyroscope and determines a travel bearing from the angular velocity of rotation. The bearing sensor in which two acceleration sensors are disposed horizontally detects accelerations at two locations by means of those two acceleration sensors and determines a travel bearing from a difference of those accelerations.

However, because the vibratory gyroscope is expensive, the navigation system in which the bearing sensor uses the vibratory gyroscope also becomes expensive.

On the other hand, the navigation system with the bearing sensor having two acceleration sensors disposed horizontally is too large, because those two acceleration sensors have to be disposed horizontally in an adequate space within the system.

Accordingly, it is an object of the present invention to provide a small and inexpensive bearing sensor which can detect a travel bearing of a vehicle.

It is another object of the present invention to provide a small and inexpensive bearing-distance sensor which can detect a travel bearing and a travel distance of a vehicle.

SUMMARY OF THE INVENTION

A bearing sensor according to one embodiment of the present invention comprises a first acceleration sensor for detecting an acceleration in a first direction to obtain a signal related to the acceleration in the first direction, and a second acceleration sensor for detecting a force applied in a direction perpendicular to the first direction to obtain a signal related to the force applied in the direction perpendicular to the first direction, and the bearing sensor determines a travel bearing of a vehicle from the output signals of the first and second acceleration sensors.

In the bearing sensor described above, the travel bearing of the vehicle is determined from the output signals of the first and second acceleration sensors by using a first integrating circuit for integrating the output signal of the first acceleration sensor over time to obtain a signal related to a velocity in the first direction; a first arithmetic circuit for obtaining a signal related to a radius of curvature from the output signal of the second acceleration sensor and the output signal of the first integrating circuit; a second arithmetic circuit for obtaining a signal related to an angular velocity from the output signal of the first arithmetic circuit and the output signal of the first integrating circuit; and another integrating circuit for integrating the output signal of the second arithmetic circuit over time to obtain a signal related to the travel bearing of the vehicle.

Alternatively, the travel bearing is found by using the first integrating circuit for integrating the output signal of the first acceleration sensor over time to obtain the signal related to the velocity in the first direction; an arithmetic circuit for obtaining a signal related to an angular velocity from the output signal of the second acceleration sensor and the output signal of the first integrating circuit; and another integrating circuit for integrating the output signal of the arithmetic circuit over time to obtain a signal related to the travel bearing of the vehicle.

A bearing-distance sensor according to one embodiment of the present invention comprises a first acceleration sensor for detecting an acceleration in a first direction to obtain a signal related to the acceleration in the first direction and a second acceleration sensor for detecting a force applied in a direction perpendicular to the first direction to obtain a signal related to the force applied in the direction perpendicular to the first direction. The sensor finds a travel distance of a vehicle from the output signal of the first acceleration sensor and finds a travel bearing of the vehicle from the output signals of the first and second acceleration sensors.

In the bearing-distance sensor described above, the travel distance of the vehicle is found from the output signal of the first acceleration sensor by using a first integrating circuit for integrating the output signal of the first acceleration sensor over time to obtain a signal related to a velocity in the first direction and a second integrating circuit for integrating the output signal of the first integrating circuit over time to obtain a signal related to the travel distance of the vehicle.

Further, in the bearing-distance sensor described above, the travel bearing of the vehicle is found from the output signals of the first and second acceleration sensors by using the first integrating circuit for integrating the output signal of the first acceleration sensor over time to obtain the signal related to the velocity in the first direction; a first arithmetic circuit for obtaining a signal related to a radius of curvature from the output signal of the second acceleration sensor and the output signal of the first integrating circuit; a second arithmetic circuit for obtaining a signal related to an angular velocity from the output signal of the first arithmetic circuit and the output signal of the first integrating circuit; and a third integrating circuit for integrating the output signal of the second arithmetic circuit over time to obtain a signal related to the travel bearing of the vehicle.

Alternatively, the travel bearing is found by using the first integrating circuit for integrating the output signal of the first acceleration sensor over time to obtain the signal related to the velocity in the first direction; the arithmetic circuit for obtaining the signal related to the angular velocity from the output signal of the second acceleration sensor and the output signal of the first integrating circuit; and the third integrating circuit for integrating the output signal of the arithmetic circuit over time to obtain the signal related to the travel bearing of the vehicle.

In the bearing sensor and the bearing-distance sensor described above, an acceleration in a first direction is detected and a signal related to the acceleration in the first direction is obtained by the first acceleration sensor. A force applied in a direction perpendicular to the first direction is detected and a signal related to the force applied in the direction perpendicular to the first direction is obtained by the second acceleration sensor.

In the bearing sensor, a travel bearing of the vehicle is found from the output signals of the first and second acceleration sensors.

In the bearing-distance sensor, a travel distance of the vehicle is found from the output signal of the first acceleration sensor and a travel bearing of the vehicle is found from the output signals of the first and second acceleration sensors.

Accordingly, the present invention can realize a small and inexpensive bearing sensor capable of detecting the travel bearing of the vehicle because no expensive vibratory gyroscope needs to be used and two acceleration sensors need not be disposed with a wide space therebetween to detect the travel bearing of the vehicle.

Further, the present invention can realize a small and inexpensive bearing-distance sensor capable of detecting the travel bearing and travel distance of the vehicle, because no expensive vibratory gyroscope needs to be used and two acceleration sensors need not be disposed with a wide space therebetween to detect the travel bearing and the travel distance of the vehicle.

Therefore, the present invention allows miniaturization and cost reduction of a system such as a navigation system which requires a bearing sensor and a distance sensor.

The above and other related objects and features of the present invention will be apparent from a reading of the following detailed description of preferred embodiments, with reference to the accompanying drawings.

Other features and advantages of the present invention will become apparent from the following description of the invention which refers to the accompanying drawings.

BRIEF DESCRIPTION OF THE DRAWINGS

FIG. 1 is a diagrammatic plan view illustrating one preferred embodiment of the present invention;

FIG. 3 is an exploded perspective view illustrating an acceleration sensor used in the embodiment shown in FIG. 1;

DETAILED DESCRIPTION OF EMBODIMENTS OF THE INVENTION

Preferred embodiments of the present invention will be explained below with reference to the drawings.

Figure 2:
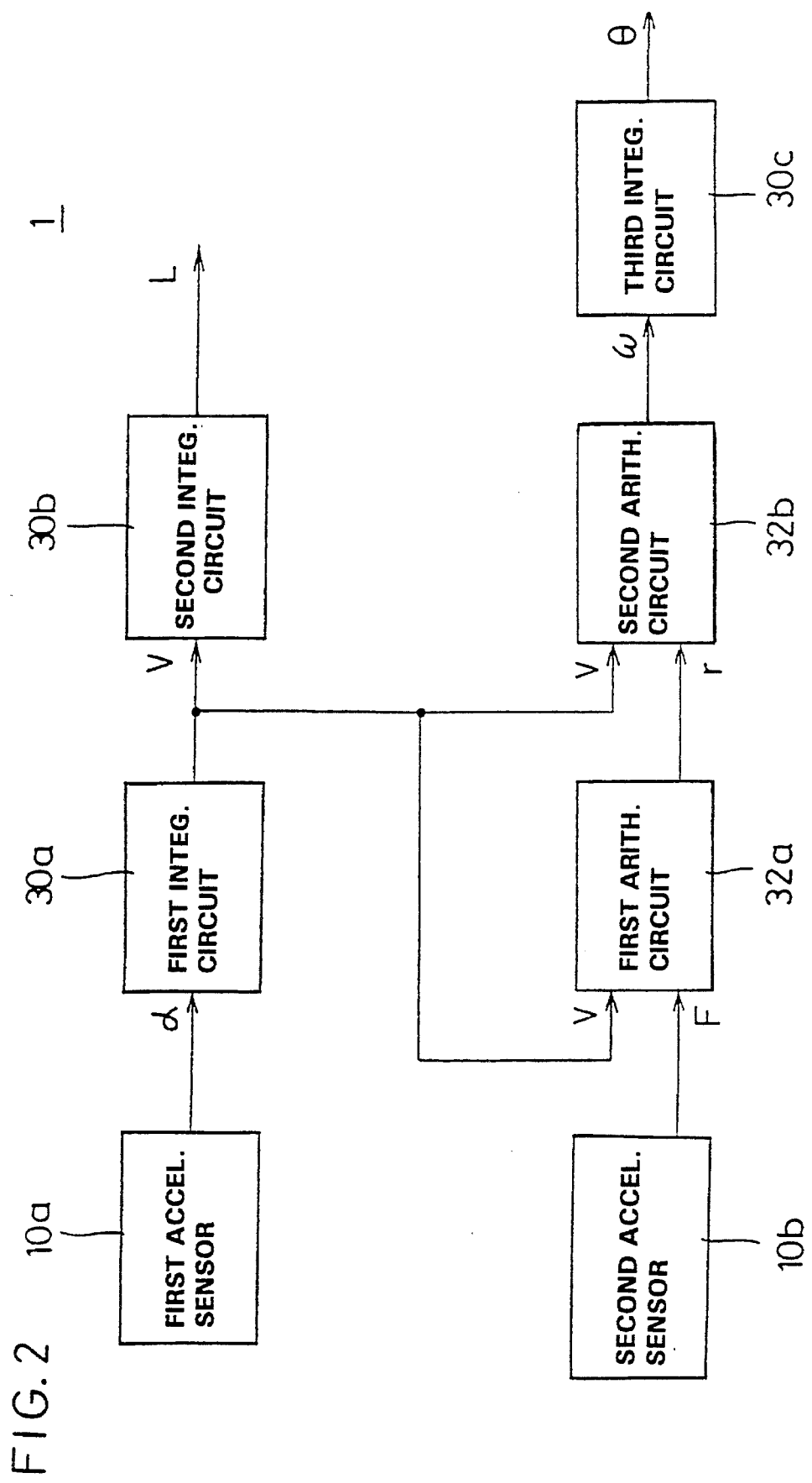
FIG. 2 is a block diagram of the embodiment shown in FIG. 1.

FIG. 1 is a diagrammatic plan view illustrating one embodiment of the present invention and FIG. 2 is a block diagram of the embodiment shown in FIG. 1. A bearing-distance sensor 1 includes a rectangular parallelepiped case 2 for example.

In the figure, a first acceleration sensor 10a and a second acceleration sensor 10b are mounted within the case 2. The first acceleration sensor 10a detects an acceleration in a first direction, e.g. a longitudinal direction of the case 2, to obtain a signal related to that acceleration. The second acceleration sensor 10b detects a force applied in a width direction of the case 2, which is perpendicular to the first direction, to obtain a signal related to that force.

In this non-limiting embodiment of the invention, the first acceleration sensor 10a and the second acceleration sensor 10b have the same structure. The structure of the first acceleration sensor 10a will now be described in detail with reference to FIGS. 3 and 4.

The first acceleration sensor 10a includes a vibrator 12 which vibrates in the longitudinal direction and which includes a strip vibrating member 14 which is made of a permanently elastic metallic material such as nickel, iron, chrome or titanium, or an alloy of those materials such as elinvar or an iron-nickel alloy. Note that the vibrating member 14 may also be made of a material such as silica, glass, quartz or ceramic, besides the metals that are generally used to generate mechanical vibration.

Two piezoelectric elements 16a and 16b are formed respectively on both main surfaces of the vibrating member 14 so as to face each other, on a proximal side of the center of the vibrating member 14, in the longitudinal direction. One piezoelectric element 16a includes a piezoelectric layer 18a composed of ceramic for example and electrodes 20a and 22a are formed respectively on both main surfaces of the piezoelectric layer 18a. The electrode 20a is adhered on one main surface of the vibrating member 14 by an adhesive for example. Similarly, the other piezoelectric element 16b includes a piezoelectric layer 18b composed of ceramic for example and electrodes 20b and 22b are formed respectively on both main surfaces of the piezoelectric layer 18b. The electrode 20b is adhered on the other main surface of the vibrating member 14 by an adhesive for example. The piezoelectric layers 18a and 18b of those piezoelectric elements 16a and 16b are polarized in the direction from the electrodes 22a and 22b to the electrodes 20a and 20b, i.e. in a thickness direction of the piezoelectric elements and inwardly toward the vibrating member 14.

Further, two piezoelectric elements 16c and 16d are formed respectively on both main surfaces of the vibrating member 14 so as to face each other, on a distal side of the center of the vibrating member 14, in the longitudinal direction. One piezoelectric element 16c includes a piezoelectric layer 18c composed of ceramic for example and electrodes 20c and 22c are formed respectively on both main surfaces of the piezoelectric layer 18c. The electrode 20c is adhered on one main surface of the vibrating member 14 by an adhesive for example. Similarly, the other piezoelectric element 16d includes a piezoelectric layer 18d composed of ceramic for example and electrodes 20d and 22d are formed respectively on both main surfaces of the piezoelectric layer 18d. The electrode 20d is adhered on the other main surface of the vibrating member 14 by an adhesive for example. The piezoelectric layers 18c and 18d of those piezoelectric elements 16c and 16d are polarized in the direction from the electrodes 20c and 20d to the electrodes 22c and 22d, i.e. in a thickness direction of the piezoelectric elements and outwardly from the vibrating member 14.

The vibrator 12 vibrates in the longitudinal direction thereof when driving signals having the same phase are applied to the piezoelectric elements 16a through 16d. In this case, because the piezoelectric elements 16a and 16b on the one hand, and the piezoelectric elements 16c and 16d on the other hand, are polarized in opposite directions, they are displaced in opposite directions. Because of this arrangement, when a part on the proximal end of the vibrating member 14 expands in the longitudinal direction, a corresponding part on the distal end of the vibrating member 14 contracts in the longitudinal direction as shown by solid-line arrows in FIG. 4. Conversely, when the part on the proximal end of the vibrating member 14 contracts in the longitudinal direction, the corresponding part on the distal end of the vibrating member 14 expands in the longitudinal direction as shown by dashed line arrows in FIG. 4. A distance between the ends of the vibrating member 14 in the longitudinal direction, i.e., its length, barely changes in this case because the degree of expansion/contraction of any part on one end of the vibrating member 14 is cancelled by the degree of expansion/contraction of a corresponding part on the other end of the vibrating member 14. The vibrational nodes of the vibrating member 14 are at the middle portions of the piezoelectric elements 16a, 16b, 16c and 16d. The antinodes of the vibrating member 14 are at its ends.

Two circular holes 14a for example are created at the two nodal portions of the vibrating member 14 of the vibrator 12. Those two holes 14a increase the deflection of the vibrating member 14 caused by an acceleration and stabilize the vibration of the vibrating member 14 in the longitudinal direction.

Two supporting members 24 are formed on the sides of one end of the vibrator 12. In this case, those two supporting members 24 are formed integrally as a unit with the vibrating member 14 and extend outwardly from the nodal portion of a proximal half of the vibrating member 14, and also extend from the proximal end of the vibrating member 14. Those supporting members 24 support the proximal end of the vibrator 12.

Further, two mounting members 26 are formed projecting from a distal half of the vibrating member 14. In this case, the mounting members 26 extend outwardly from the nodal portion adjacent to the distal end of the vibrating member 14 and are formed integrally as a unit with the vibrating member 14. Weights 28 are mounted on both main surfaces of those mounting members 26 by welding or soldering. Those weights 28 increase the deflection of the vibrating member 14 caused by an acceleration.

Figure 4:
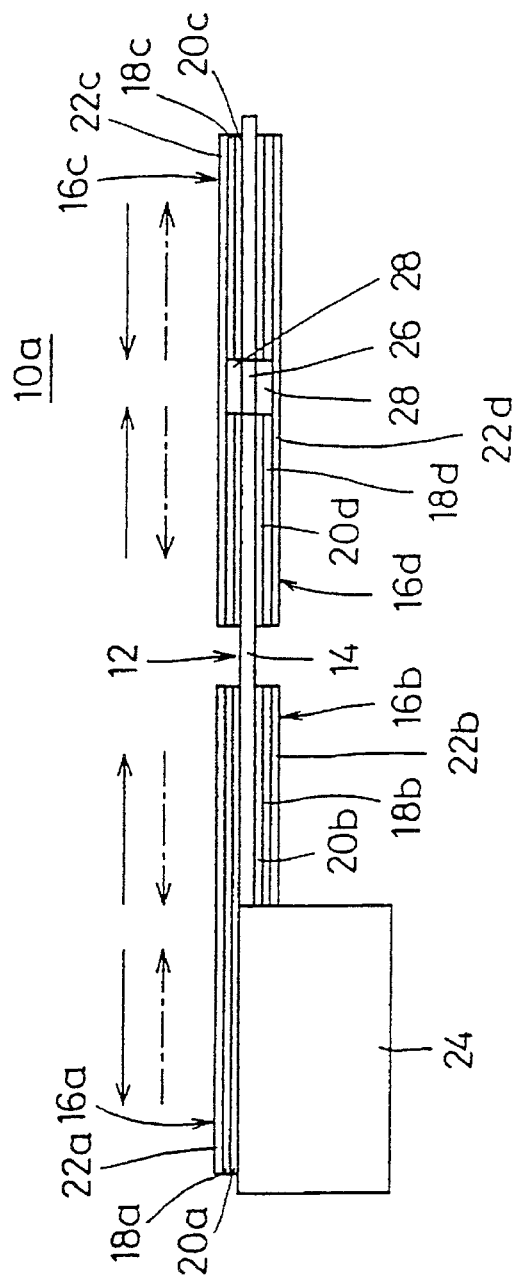
FIG. 4 is a side view of the acceleration sensor used in the embodiment shown in FIG. 1.

In the first acceleration sensor 10a, the vibrator 12 vibrates in the longitudinal direction as shown by the solid-line arrows and the dashed-line arrows in FIG. 4 when one end of the vibrator 12 is supported by fixing the two supporting members 24 and when driving signals having the same phase are applied to the four piezoelectric elements 16a through 16d.

Then, when an acceleration is applied to the vibrating member 14 of the vibrator 12 in the direction perpendicular to the main surface thereof, the vibrating member 14 deflects together with the piezoelectric elements 16a through 16d corresponding to the acceleration, and voltages which correspond with the deflection are generated in the piezoelectric elements 16a through 16d. As a result, the acceleration may be detected by measuring any of the voltages generated in the piezoelectric elements 16a through 16d.

Further, because holes 14a are created respectively at the two nodal portions of the vibrating member 14 in the first acceleration sensor 10a, the deflection of the vibrating member 14 caused by the acceleration is increased and the vibration of the vibrating member 14 in the longitudinal direction is stabilized by keeping the balance of the vibration of the vibrating member 14 in the longitudinal direction. Thus the acceleration-detecting sensitivity of the first acceleration sensor 10a is improved.

Further, because the weights 28 are mounted to the mounting members 26 near the nodal portion of the vibrator 12 in the first acceleration sensor 10a, the deflection of the vibrating member 14 is increased and the acceleration-detecting sensitivity is increased. The weights 28 do not interfere with the vibration of the vibrator 12 since almost no vibration of the vibrator 12 is transmitted to the weights 28.

Note that although in this embodiment the holes 14 at those two nodal portions of the vibrating member 14 in the first acceleration sensor 10a are circular, the holes created at the nodal portions may also have another shape such as a rectangular shape instead of the circular shape. Further, the number of holes created at each nodal portion is not confined to only one and may be two or more.

The first acceleration sensor 10a can detect an acceleration by detecting a difference of voltages generated by the piezoelectric elements 16a and 16b and a difference of voltages generated by the piezoelectric elements 16c and 16d.

In a modified embodiment of the first acceleration sensor 10a, the polarizing direction of the piezoelectric layer of more than one piezoelectric element may be reversed, as long as the phase of driving signal applied to the piezoelectric element whose polarizing direction is reversed is also reversed.

The main reason why the vibrator is vibrated in the longitudinal direction in the first acceleration sensor 10a is because the vibrator deflects significantly when an acceleration is applied to the vibrator when the vibrator vibrates in the longitudinal direction, thus improving the acceleration detecting sensitivity.

The supporting member 24 of this first acceleration sensor 10a is fixed within the case 2 so that the main surface of the vibrating member 14 crosses at right angles with the longitudinal direction of the case 2. Accordingly, an acceleration $\alpha$ in the longitudinal direction of the case 2 is detected and a signal related to the acceleration $\alpha$ is obtained by the first acceleration sensor 10a.

The supporting member 24 of the second acceleration sensor 10b having the same structure as the first acceleration sensor 10a is fixed within the case 2 so that the main surface of the vibrating member 14 thereof crosses at right angles with the width direction of the case 2. Accordingly, a force F applied in the width direction of the case 2 is detected and a signal related to the force F is obtained by the second acceleration sensor 10b.

An output terminal of the first acceleration sensor 10a is connected to an input terminal of a first integrating circuit 30a as shown in FIG. 2. The first integrating circuit 30a integrates the output signal of the first acceleration sensor 10a related to the acceleration $\alpha$ in the longitudinal direction of the case 2 over time to obtain a signal related to a velocity V in the longitudinal direction of the case 2.

An output terminal of the first integrating circuit 30a is connected to an input terminal of a second integrating circuit 30b. The second integrating circuit 30b integrates the output signal of the first integrating circuit 30a related to the velocity V in the longitudinal direction of the case 2 over time to obtain a signal related to a travel distance L of the vehicle.

An output terminal of the second acceleration sensor 10b and the output terminal of the first integrating circuit 30a are connected respectively to two input terminals of a first arithmetic circuit 32a. The first arithmetic circuit 32a obtains a signal related to a radius of curvature r on the basis of the output signal of the second acceleration sensor 10b related to a centrifugal force F applied in the width direction of the case 2, and the output signal of the first integrating circuit 30a related to the velocity V in the longitudinal direction of the case 2. Note that the first arithmetic circuit 32a may be realized to calculate the relationship $r=mV^2/F$, where m is a mass of a moving part.

An output terminal of the first arithmetic circuit 32a and the output terminal of the first integrating circuit 30a are connected respectively to two input terminals of a second arithmetic circuit 32b. The second arithmetic circuit 32b obtains a signal related to an angular velocity ω on the basis of the output signal of the first arithmetic circuit 32a related to the radius of curvature r, and the output signal of the first integrating circuit 30a related to the velocity V in the longitudinal direction of the case 2. Note that this second arithmetic circuit 32b may be realized to calculate the relationship ω=V/r.

An output terminal of the second arithmetic circuit 32b is connected to an input terminal of a third integrating circuit 30c. The third integrating circuit 30c integrates the output signal of the second arithmetic circuit 32b related to the angular velocity ω over time to obtain a signal related to a travel bearing θ of the vehicle.

Figure 5:
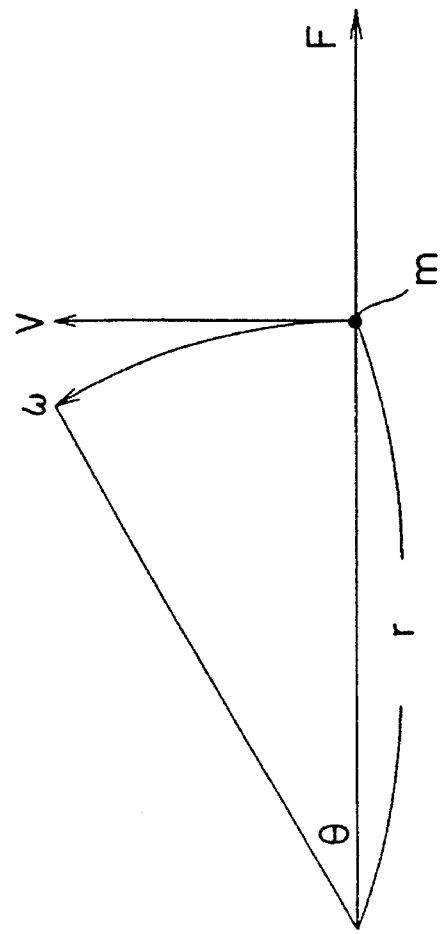
FIG. 5 is a graph showing a relationship among a velocity V of a moving part of mass m, a radius of curvature r, an angular velocity ω, a centrifugal force F and a travel bearing θ.

FIG. 5 shows a relationship among the velocity V at the moving part of the mass m, the radius of curvature r, the angular velocity ω, the centrifugal force F and the travel bearing θ.

The bearing-distance sensor 1 is mounted in a automobile 40 so that the longitudinal direction and the width direction of the case 2 run parallel respectively with the longitudinal direction and the width direction of the automobile 40 as shown in FIG. 1. Accordingly, the acceleration α in the longitudinal direction of the automobile 40 is detected and the signal related to the acceleration α is obtained by the first acceleration sensor 10a. The centrifugal force F applied in the width direction of the automobile 40 is detected and the signal related to the centrifugal force F is obtained by the second acceleration sensor 10b.

Further, the output signal of the first acceleration sensor 10a related to the acceleration α in the longitudinal direction of the automobile 40 is integrated over time and the signal related to the velocity V in the longitudinal direction of the automobile 40 is obtained by the first integrating circuit 30a.

The output signal of the first integrating circuit 30a related to the velocity V in the longitudinal direction of the automobile 40 is integrated over time and the signal related to the travel distance L in the longitudinal direction of the automobile 40 is obtained by the second integrating circuit 30b.

The signal related to the radius of curvature r is obtained from the output signal of the second acceleration sensor 10b related to the centrifugal force F applied in the width direction of the automobile 40 and the output signal of the first integrating circuit 30a related to the velocity V in the longitudinal direction of the automobile 40.

The signal related to the angular velocity ω is obtained from the output signal of the first arithmetic circuit 32a related to the radius of curvature r and the output signal of the first integrating circuit 30a related to the velocity V in the longitudinal direction of the automobile 40.

Then the output signal of the second arithmetic circuit 32b related to the angular velocity ω is integrated over time and the signal related to the travel bearing θ of the automobile 40 is obtained by the third integrating circuit 30c.

Accordingly, this bearing-distance sensor 1 can detect the travel bearing θ and the travel distance L of the automobile 40.

Further, because no expensive vibratory gyroscope is used and two acceleration sensors need not be disposed with a wide space therebetween in the bearing-distance sensor 1, it can be small and inexpensive.

Figure 6:
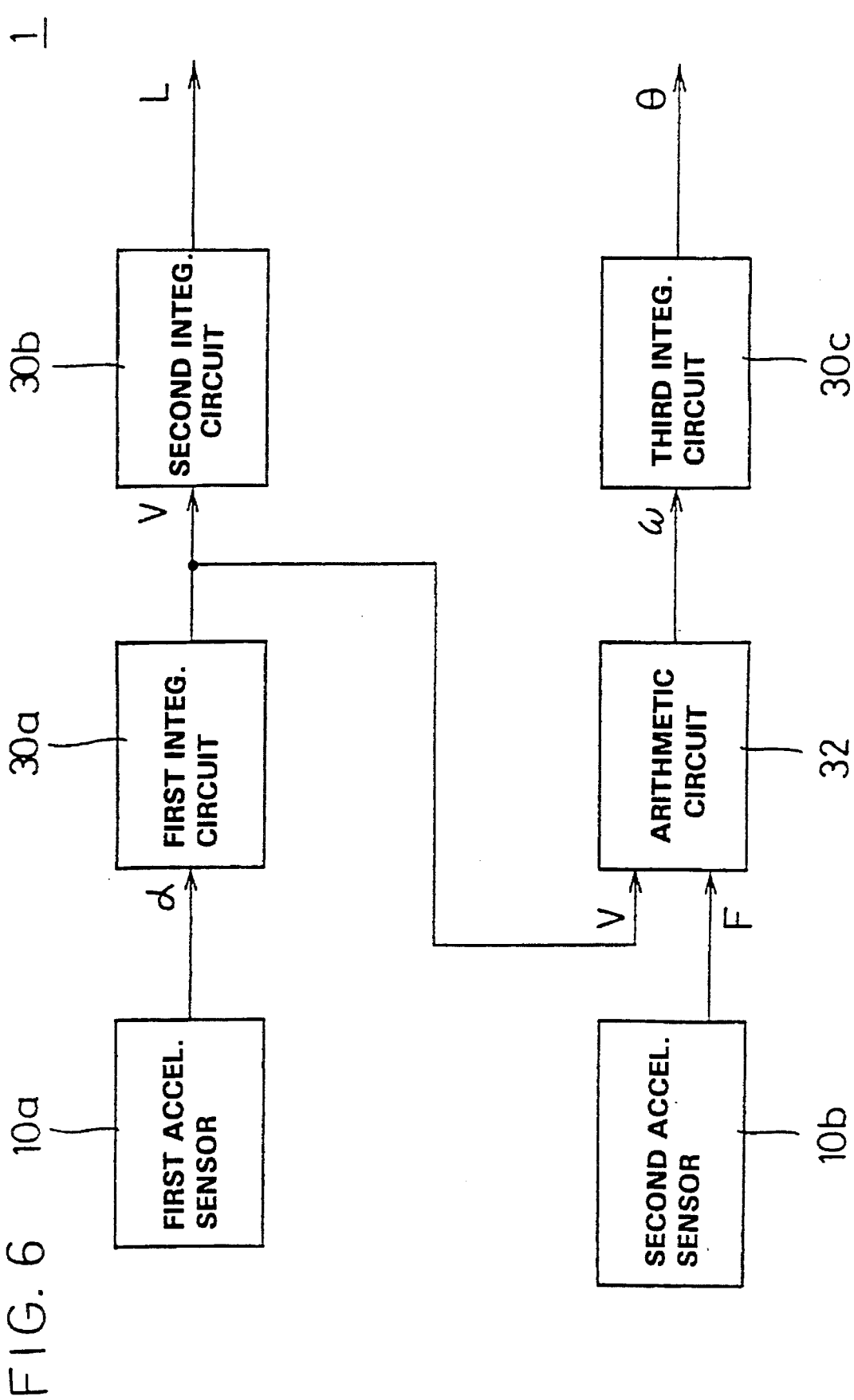
FIG. 6 is a block diagram illustrating another embodiment of the present invention.

FIG. 6 is a block diagram showing another embodiment of the present invention. In the embodiment shown in FIG. 6, one arithmetic circuit 32 is provided instead of the first arithmetic circuit 32a and the second arithmetic circuit 32b provided in the embodiment shown in FIGS. 1 and 2. The output terminals of the second acceleration sensor 10b and the first integrating circuit 30a are connected respectively to two input terminals of the arithmetic circuit 32. An output terminal of the arithmetic circuit 32 is connected to the input terminal of the third integrating circuit 30c. The arithmetic circuit 32 obtains a signal related to the angular velocity ω from the output signal of the second acceleration sensor 10b related to the centrifugal force F applied in the width direction of the case 2 and the output signal of the first integrating circuit 30a related to the velocity V in the longitudinal direction of the case 2. This arithmetic circuit 32 is realized to calculate the relationship ω=F/(mV), where m is a mass of the moving part.

The embodiment shown in FIG. 6 can detect a travel bearing and a travel distance of a vehicle such as an automobile and can be small and inexpensive, similarly to the embodiment shown in FIGS. 1 and 2. Note that the circuit structure of the embodiment shown in FIG. 6 may be simplified as compared to the embodiment shown in FIGS. 1 and 2 because one less arithmetic circuit is used.

Note that although angular velocity and acceleration sensors having particular structures are used as the first acceleration sensor and the second acceleration sensor in each embodiment described above, sensors having other structures may also be used in the present invention.

A bearing sensor which can detect only the travel bearing θ of the vehicle may be constructed by removing the second integrating circuit 30b in each embodiment shown in FIGS. 2 and 6. In this case, the bearing sensor can be small and inexpensive because no expensive vibratory gyroscope is used and two acceleration sensors need not be disposed with a wide space therebetween.

Further, a navigation system that detects only the travel bearing θ of the vehicle may be readily provided by simply adding one acceleration sensor having the simple structure shown in each embodiment described above, and by using a signal (which corresponds to the velocity V output from the first integrating circuit 30a) that can be obtained from a speed sensor conventionally mounted in a vehicle such as an automobile. As a result, an inexpensive navigation system may be readily realized.

While preferred embodiments have been described, variations thereto will occur to those skilled in the art within the scope of the present inventive concepts which are delineated by the following claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bearing sensor for an automobile, comprising:
   a first acceleration sensor being disposed on the automobile for detecting an acceleration of the automobile in a longitudinal direction of the automobile to obtain a signal related to the acceleration in said longitudinal direction;

a second acceleration sensor being disposed on the automobile for detecting a centrifugal force applied to the automobile in a direction perpendicular to said longitudinal direction to obtain a signal related to the centrifugal force applied in the direction perpendicular to said longitudinal direction;

a first integrating circuit for integrating the output signal of said first acceleration sensor over time to obtain a signal related to a velocity in said longitudinal direction;

a first arithmetic circuit for obtaining a signal related to a radius of curvature from the output signal of said second acceleration sensor and the output signal of said first integrating circuit;

a second arithmetic circuit for obtaining a signal related to an angular velocity from the output signal of said first arithmetic circuit and the output signal of said first integrating circuit; and a further integrating circuit for integrating the output signal of said second arithmetic circuit over time to obtain a signal related to the travel bearing of said automobile.

2. A bearing sensor for an automobile, comprising:

a first acceleration sensor being disposed on the automobile for detecting an acceleration of the automobile in a longitudinal direction of the automobile to obtain a signal related to the acceleration in said longitudinal direction;

a second acceleration sensor being disposed on the automobile for detecting a centrifugal force applied to the automobile in a direction perpendicular to said longitudinal direction to obtain a signal related to the centrifugal force applied in the direction perpendicular to said longitudinal direction;

a first integrating circuit for integrating the output signal of said first acceleration sensor over time to obtain a signal related to a velocity in said longitudinal direction;

an arithmetic circuit for obtaining a signal related to an angular velocity from the output signal of said second acceleration sensor and the output signal of said first integrating circuit; and a further integrating circuit for integrating the output signal of said arithmetic circuit over time to obtain a signal related to the travel bearing of said automobile.

3. A bearing-distance sensor for an automobile, comprising:

a first acceleration sensor being disposed on the automobile for detecting an acceleration of the automobile in a longitudinal direction of the automobile to obtain a signal related to the acceleration in said longitudinal direction;

a second acceleration sensor being disposed on the automobile for detecting a centrifugal force applied to the automobile in a direction perpendicular to said longitudinal direction to obtain a signal related to the centrifugal force applied in the direction perpendicular to said longitudinal direction;

a first integrating circuit for integrating the output signal of said first acceleration sensor over time to obtain a signal related to a velocity in said longitudinal direction;

a second integrating circuit for integrating the output signal of said first integrating circuit to obtain a signal related to a travel distance of said automobile;

a first arithmetic circuit for obtaining a signal related to a radius of curvature from the output signal of said second acceleration sensor and the output signal of said first integrating circuit;

a second arithmetic circuit for obtaining a signal related to an angular velocity from the output signal of said first arithmetic circuit and the output signal of said first integrating circuit; and a third integrating circuit for integrating the output signal of said second arithmetic circuit over time to obtain a signal related to the travel bearing of said automobile.

4. A bearing-distance sensor for an automobile, comprising:

a first acceleration sensor being disposed on the automobile for detecting an acceleration of the automobile in a longitudinal direction of the automobile to obtain a signal related to the acceleration in said longitudinal direction;

a second acceleration sensor being disposed on the automobile for detecting a centrifugal force applied to the automobile in a direction perpendicular to said longitudinal direction to obtain a signal related to the centrifugal force applied in the direction perpendicular to said longitudinal direction;

a first integrating circuit for integrating the output signal of said first acceleration sensor over time to obtain a signal related to a velocity in said longitudinal direction;

a second integrating circuit for integrating the output signal of said first integrating circuit to obtain a signal related to a traveling distance of said automobile;

an arithmetic circuit for obtaining a signal related to an angular velocity from the output signal of said second acceleration sensor and the output signal of said first integrating circuit; and a third integrating circuit for integrating the output signal of said arithmetic circuit over time to obtain a signal related to the travel bearing of said automobile.

* * * * *